US009215385B2

(12) United States Patent
Luo

(10) Patent No.: US 9,215,385 B2
(45) Date of Patent: Dec. 15, 2015

(54) SYSTEM AND METHOD FOR AN IMAGE SENSOR OPERABLE IN MULTIPLE VIDEO STANDARDS

(75) Inventor: Xiaodong Luo, San Jose, CA (US)

(73) Assignee: OMINIVISION TECHNOLOGIES, INC., Santa Clara, CA (US)

( * ) Notice: Subject to any disclaimer, the term of this patent is extended or adjusted under 35 U.S.C. 154(b) by 790 days.

(21) Appl. No.: 13/380,391

(22) PCT Filed: Jun. 11, 2010

(86) PCT No.: PCT/US2010/038381
§ 371 (c)(1),
(2), (4) Date: Apr. 17, 2012

(87) PCT Pub. No.: WO2011/005413
PCT Pub. Date: Jan. 13, 2011

(65) Prior Publication Data
US 2012/0194735 A1    Aug. 2, 2012

Related U.S. Application Data

(60) Provisional application No. 61/219,183, filed on Jun. 22, 2009.

(51) Int. Cl.
*H04N 7/01* (2006.01)
*H04N 5/343* (2011.01)
*H04N 5/232* (2006.01)
*H04N 5/378* (2011.01)

(52) U.S. Cl.
CPC ........... *H04N 5/343* (2013.01); *H04N 5/23245* (2013.01); *H04N 5/378* (2013.01)

(58) Field of Classification Search
USPC ................................................. 348/441, 469
See application file for complete search history.

(56) References Cited

U.S. PATENT DOCUMENTS

| 4,908,874 | A  |   | 3/1990  | Gabriel |
|-----------|----|---|---------|---------|
| 7,248,784 | B1 | * | 7/2007  | Kori et al. ................. 386/232 |
| 7,379,105 | B1 |   | 5/2008  | Frank et al. |
| 2004/0218099 | A1 | * | 11/2004 | Washington ............ 348/571 |
| 2007/0025644 | A1 | * | 2/2007  | Wang et al. .............. 382/300 |

FOREIGN PATENT DOCUMENTS

EP    0865020 A2    9/1998
JP    2005006078 A    1/2005

OTHER PUBLICATIONS

International Search Report and Written Opinion in related PCT Patent Application Serial No. PCT/US2010/038381 dated Jan. 21, 2011, 8 pages.

* cited by examiner

*Primary Examiner* — Roberto Velez
*Assistant Examiner* — Stephen Coleman
(74) *Attorney, Agent, or Firm* — Lathrop & Gage LLP

(57) ABSTRACT

An image sensor system and associated method supporting multiple video output standards, such as NTSC and PAL, including a pixel array corresponding in size to the frame size having a smaller line number of the video standards, is described. System and method for resolving discrepancies between standards includes multiple crystal oscillators or frequency synthesis to derive a dot clock, and a standard-specific pixel read-out scheme that provides additional lines when outputting according to the frame size having a larger line number of the video standards. In an embodiment, additional line video data is derived by duplicating a line of image data, and in an alternative embodiment additional line video data is derived by digital vertical interpolation.

7 Claims, 3 Drawing Sheets

310
Row 1, Row 2, Row 3, Row 4, Row 5, Row 6, Row 7, Row 8, Row 9, Row 10, Row 11, ..., Row 479, Row 480

320
Row 1, Row 2, Row 3, Row 4, Row 5 322, Row 5 324, Row 6 326, Row 7, Row 8, Row 9, Row 10, Row 10, Row 11, ..., Row 479, Row 480

SYSTEM AND METHOD FOR AN IMAGE SENSOR OPERABLE IN MULTIPLE VIDEO STANDARDS

CROSS-REFERENCE TO RELATED APPLICATIONS

This application claims the benefit of priority to U.S. Provisional Patent Application Ser. No. 61/219,183 filed Jun. 22, 2009, which is incorporated herein by reference.

BACKGROUND

Image sensors are electronic integrated circuits that can be used to produce still or video images. Solid state image sensors can be, for example, of the charge coupled device ("CCD") type or the complementary metal oxide semiconductor ("CMOS") type. Either type of image sensor includes a two-dimensional array of pixels, wherein each pixel is a semiconductor device that transforms incident light photons into an electrical current signal. Applications for image sensors include cell phones, digital cameras and camcorders, webcams, automotive and medical equipment, and security cameras.

Image sensors used in automotive, medical and surveillance cameras are typically small, low voltage, low power consumption sensors that support analog composite video output and are capable of directly interfacing with a video cassette recorder ("VCR"), a television ("TV") or a monitor. When it comes to analog video communication, it is notable that different regions in the world have adopted different video/TV standards; accordingly, products targeting a specific region must meet the local standard. The two most common video standards today are generally referred to as National Television System Committee ("NTSC") and Phase Alternating Line ("PAL"). NTSC uses a refresh rate of 29.97 frames per second, each frame consisting of 525 scan lines, of which only 480 are arranged as a visible raster, and carry the picture content. The remaining lines are within the vertical blanking interval, and may be used for synchronization, closed captioning and other non-imagery information. PAL, on the other hand, uses a refresh rate of 25 frames per second and a total of 625 lines per frame, 576 of which are dedicated to picture content. Some applications may use low-resolution versions of NTSC and PAL, for example using only 240 visible lines in NTSC, and 288 visible lines in PAL. A line time is the time allocated to displaying each scan line, which for NTSC is 1/(29.97*525) second. Each line time includes a horizontal blanking interval, typically used for synchronization, as well as time allocated for displaying each pixel of the image. A third common analog video standard, Sequential Color With Memory (translated from the French Séquentiel couleur à mémoire) ("SECAM"), typically used for example in France and Russia, resembles PAL in that it also uses a refresh rate of 25 frames (50 fields) and 625 lines per frame.

SUMMARY

A system for providing image data in a first mode according to a first video specification having a first number of lines of image data and in a second mode according to a second video specification having a second number of lines of image data, the second number greater than the first number has a video sensor having a pixel array having a third number of lines of pixels. In at least one embodiment the first and third number are equal, in another embodiment the third number is half the first number.

The system also has a video encoder for receiving digital video information and providing a video output and a line buffer capable of storing information corresponding to at least one line of pixels from the video sensor. A system controller is provided for controlling operation of the system, the controller interspersing an additional line after every N'th normal line in the second mode to increase a number of lines of image data provided to the video encoder to comply with the second video specification.

Digital video information derived from lines of pixels of the video sensor, which may have been stored in the line buffer, is provided to the video encoder in normal lines, and digital video information derived from at least one line of pixels of the video sensor is received from the line buffer and provided to the video encoder during each additional line.

In a particular embodiment, N is 5, the first video specification is NTSC, and the second video specification is either PAL or SECAM.

In a particular embodiment, the digital video information provided to the video encoder during each additional line duplicates a previous line. In an alternative embodiment the digital video information provided to the video encoder during each additional line is derived by interpolating between pixel data of a previous line and a following line stored in the row buffer.

An alternative color system differs from that in the above 5 paragraphs in that each line of pixel data provided to the video encoder includes color information derived from two or more lines of the pixel array. In this embodiment, the video information provided to the video encoder during additional lines is derived from two or more lines of pixel array information stored in the row buffer.

BRIEF DESCRIPTION OF DRAWINGS

FIG. 3 is a block diagram further illustrating the read-out sequence of FIG. 2, in accordance with an embodiment.

DETAILED DESCRIPTION OF ILLUSTRATED EMBODIMENTS

Figure 1:
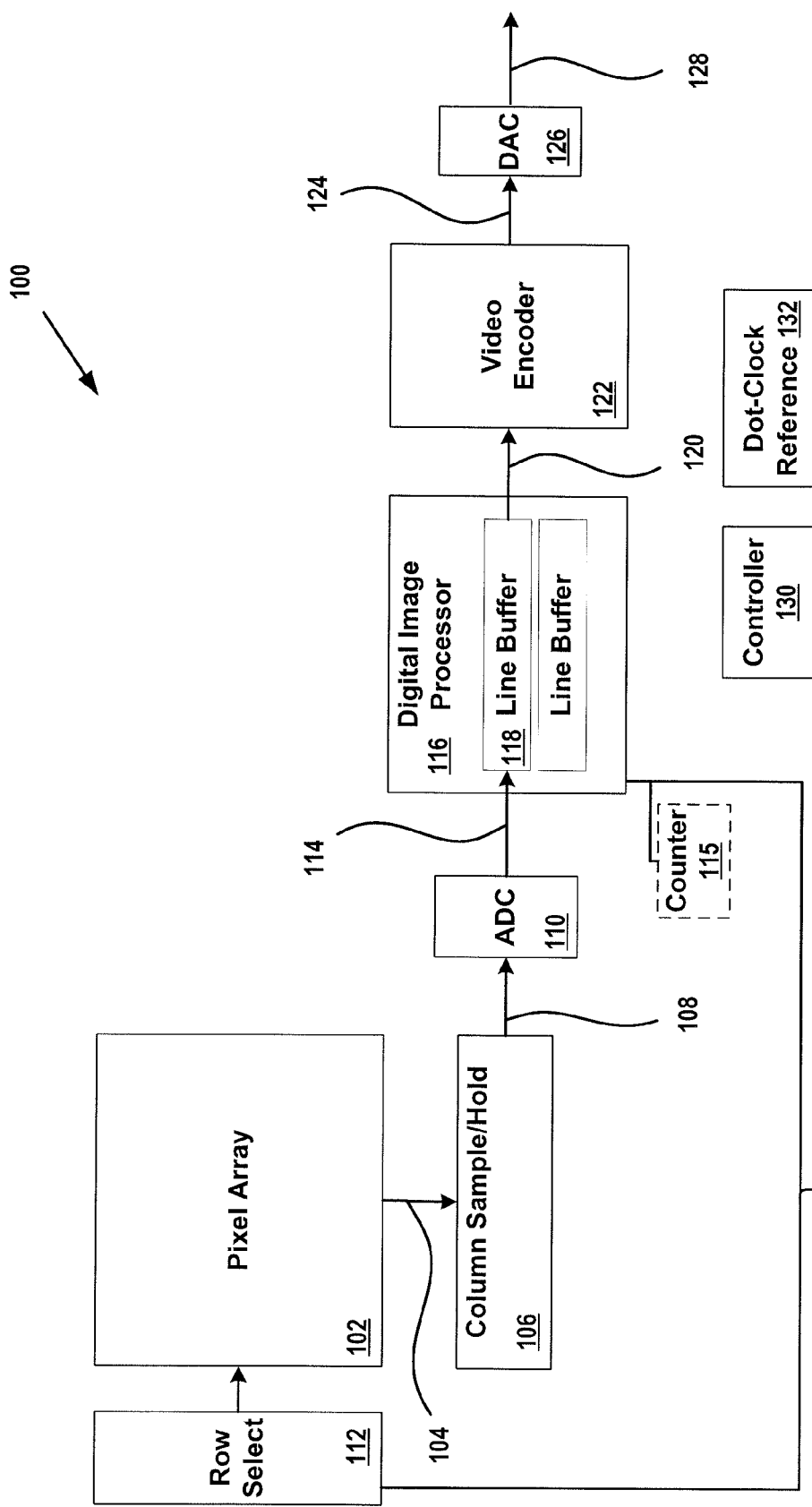
FIG. 1 is a block diagram illustrating an exemplary image sensor system, in accordance with an embodiment.

The following embodiments and aspects thereof are described and illustrated in conjunction with systems, tools and methods, which are meant to be exemplary and illustrative, not limiting in scope. In various embodiments, one or more limitations associated with the above-described systems and methods have been addressed, while other embodiments are directed to other improvements.

Despite the standards' inconsistencies in frame rate and number of visible scan lines, sensor manufacturers are motivated to develop single image sensor products that are compatible with both the 30-frame, 60-field NTSC and the 25-frame, 50-field PAL/SECAM standards. Such products may find use as security cameras, small handheld solid-state camcorders, web cameras, video toys, and other high-volume, low-cost, devices having video camera functions. Such image sensors allow manufacturers to target large consumer markets with a single product. Supporting two different pixel and frame rates may be achieved, for example, by integrating two crystal oscillators that independently generate the required clock frequencies, or a frequency synthesis integrated circuit with a single, common, reference crystal oscillator, into a sensor chip.

Supporting different number of visible scan lines (also referred to as "frame resolution") can be implemented, for example, by using an image sensor with the frame resolution of PAL and cropping the resulting image down to NTSC frame resolution. A major drawback of this method is its cost: the larger, PAL-sized, pixel array typically translates into a larger sensor area, which results in a more expensive image sensor and product than would otherwise be required to support NTSC frame resolution.

In accordance with the embodiments disclosed herein, the two mode operations may be supported using a single pixel array having a pixel array resolution corresponding to the NTSC frame resolution rather than a pixel array resolution corresponding to the PAL frame resolution. The area saved by using such an image sensor is about 25% compared to a conventional PAL-sized sensor. Combined with the appropriate processing, the resulting sensor may operate in either NTSC or PAL modes, with each mode generating analog video that is compliant with the respective standard.

When the image sensor operates in NTSC mode, the image data is read out from the pixel array sequentially, line after line. The image data is then processed by a digital image processor, encoded into NTSC video format and output. To operate in PAL mode, in addition to the above steps, the image data may be upscaled from the smaller resolution of the pixel array to a larger output resolution. While various upscaling algorithms are available, it is known that traditional sequential pixel read-out schemes create a discrepancy between the lower data rate at the pixel array output and the upscaled data rate at the sensor output. Additional line buffer(s) or a complex phase lock loop (PLL) circuit are typically required to accommodate the mismatch in data rates. However, both of these approaches increase the cost and/or the complexity of the system. Instead, the embodiments disclosed herein may utilize an unconventional pixel read-out scheme.

In FIG. 1, an exemplary embodiment of an image sensor system 100 is schematically shown. A pixel array 102 may be a two-dimensional array of photosensitive elements (i.e., pixels), such as CCD or CMOS photosensor elements, that generates image data 104 (represented by an arrow) proportional to the intensity of incident light or other optical radiation. Image data 104 from all pixels in a row may be read out simultaneously, and then stored in a column sample/hold buffer 106 as stored image data 108 (represented by an arrow). A row select module 112 controls the order in which rows of pixels are being read out. Row select module 112 may provide an every-fifth-line control output 113, as shown, or a separate counter 115 may be provided to provide an every-fifth-line control output 113, for use by a digital image processor, as explained below. It is appreciated that other schemes and architectures may be used for reading out the pixel data from pixel array 102. Stored image data 108 may then be sequentially transferred to an analog-to-digital converter ("ADC") 110, where it is translated into the digital domain as digital image data 114 (represented by an arrow).

Continuing to refer to FIG. 1, after ADC 110, digital image data 114 is passed to a digital image processor 116 including an internal line buffer 118. Digital image processor 116 buffers one or more rows, and in some embodiments at least two rows, of digital image data 114 in internal line buffer 118, digital image data in internal line buffer 118 is stored image data. Line buffer 118 is, however, too small to hold either a full field or frame, and in typical embodiments has capacity to hold eight lines or less, or less than nine lines, of pixel data or digital image data. Line buffer 118 is therefore a line buffer and not a field buffer or a frame buffer. Digital image processor 116 may run various image processing algorithms on digital image data 114 to perform analysis, color processing, image quality enhancement or other application-specific tasks, thereby producing processed digital image data 120. In many embodiments, color imaging is performed by having an array of color filter elements deposited on the pixel array in a known pattern; a common three-color filter element pattern tiles the pixel array with groups of four pixels, where two pixels share one filter color such as green, and the two remaining pixels each have a separate filter color such as red and blue. In embodiments having color sensors of this type, digital processing to derive chroma information is performed by digital image processor 116 based upon pixel data from a current row and at least one prior or following row of digital image data 114 stored in internal line buffer 118. In embodiments having color sensors of this type, digital processing to derive intensity information is typically performed using the chroma information and pixel data of the current row. Both chroma and intensity information are provided as digital image data 120 to encoder 122.

Still referring to FIG. 1, processed digital image data 120 from digital image processor 116 is output to a video encoder 122. Video encoder 122 converts processed digital image data 120 into standard-compatible digital data 124 (represented by an arrow) in a format that is compliant with the video standard in which image sensor system 100 is operating at the time. Since processed digital image data 120 received by video encoder 122 from digital image processor 116 constitutes "picture content" or a "visible raster" (in the context of a video standard), the number of pixel rows received by video encoder 122 should match or exceed the number of lines in the visible raster specified by the video standard in which image sensor system 100 is operating. Once video encoder 122 has formatted processed digital image data 120 into standard-compliant digital data 124, the data is translated back into the analog domain by a digital-to-analog converter (DAC) 126 that translates standard-compliant digital data 124 into a standard-compliant analog data 128, which is sent to the output of image sensor system 100. System 100 operates under control of controller 130, which provides control signals for operating the system, these control signals are not shown in FIG. 1 for clarity. Reference timing for system 100, including video encoder 122, is provided by a dot-clock reference 132 which in an embodiment includes a pair or more of crystal oscillators, one of which operates at a frequency appropriate for each supported video standard. Typically, dot-clock reference 132 provides a signal having a frequency equal to a rate at which pixels of standard-compliant digital data 124 are provided to DAC 126, and other system timing signals are derived from dot-clock reference 132. In an alternative embodiment, dot-clock reference 132 incorporates a phase locked loop and frequency dividers, as well as a reference oscillator; in this embodiment the frequency dividers are reprogrammed to lock the phase locked loop to a frequency appropriate for each supported video standard.

In an embodiment, pixel array 102 may have 480 rows and the image sensor may be configured under control of controller 130 to operate in two different modes: PAL/SECAM and NTSC.

Figure 2:
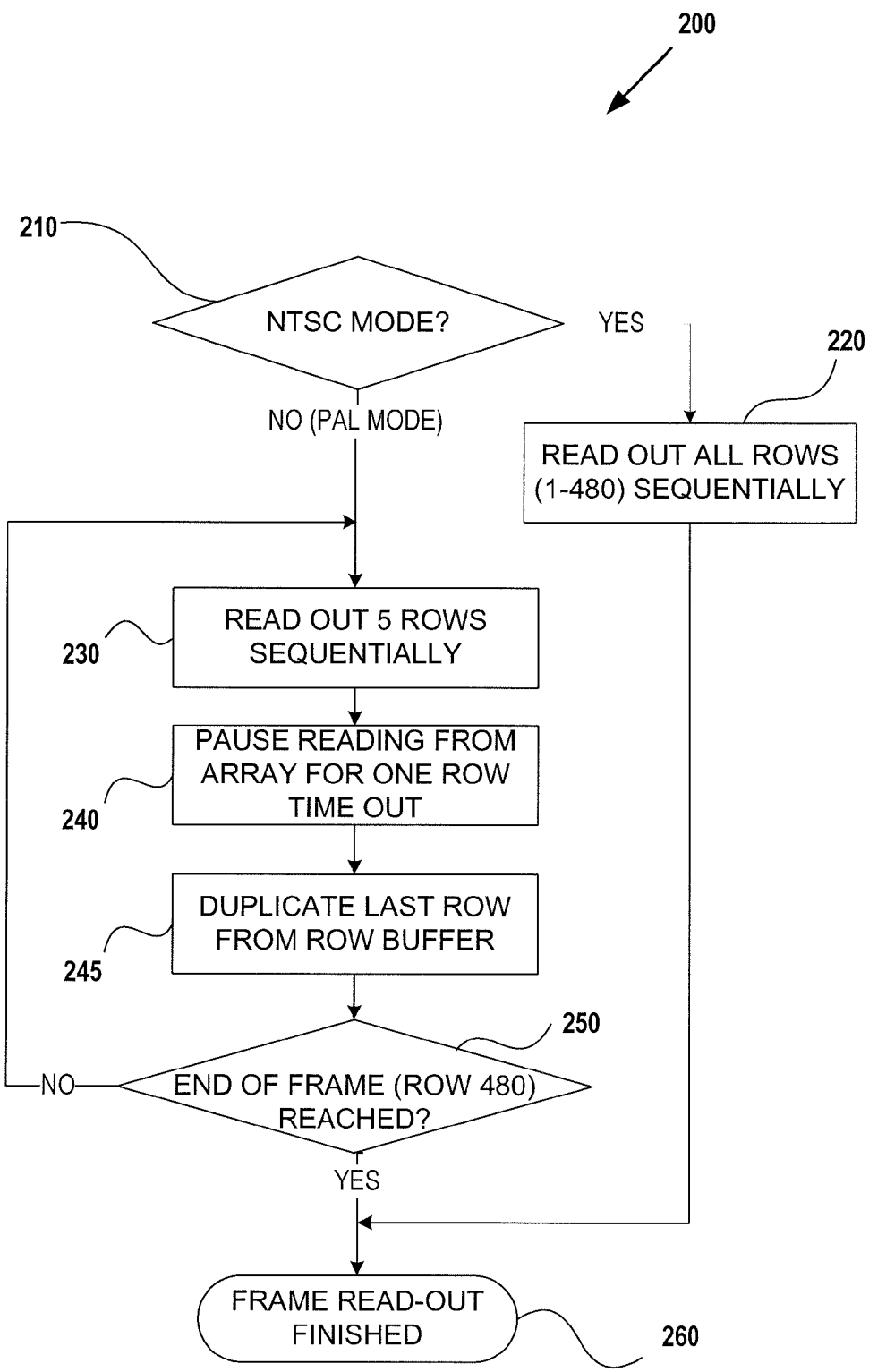
FIG. 2 is a flow chart illustrating a read-out sequence, in accordance with an embodiment.

Referring now to FIG. 2 in conjunction with FIG. 1, an exemplary pixel array read-out sequence 200, in accordance with an embodiment, is described. Pixel array read-out sequence 200 begins with a decision 210, in which the operation mode of image sensor system 100 is determined. If the answer to decision 210 is "YES", then image sensor system 100 is operating in the NTSC mode and pixel array read-out sequence 200 proceeds to a step 220. In step 220, to provide image data compliant with the NTSC standard, row select module 112 causes all pixel array rows to be read out sequentially, from row number 1 to row number 480, or in an alternative embodiment having a less expensive 320 by 240 pixel array, row number 240; this readout is performed on a 60-field basis.

As data is read from pixel array 102, each row of data from the pixel array is stored in a first in, first out, line or row buffer 118, which typically has capacity to store at least two lines of data. While data is being read from pixel array 102 into line buffer 118, previous row data and next-previous row data is read from line buffer 118 and is used for color processing and other digital image processing as known in the art to provide corrected red, blue, and green processed image data 120 to video encoder 122. Each normal line processed and provided to the video encoder is therefore derived from two successive rows of pixels of the pixel array having color filter elements disposed over them.

In some monochrome embodiments, where data from prior rows is not required for resolving color, the line buffer storage space for storing next-previous line data may be eliminated.

As the pixel array is read out from line buffer 118, image data corresponding to even rows are provided to video encoder 122 in even-numbered fields, and image data corresponding to odd rows are provided to video encoder 122 in odd-numbered fields, to provide interlacing as known in the art of NTSC video.

It should be noted that fifth-line control signal 113 is either ignored or suppressed in NTSC mode.

Still referring to FIG. 2, if the answer to decision 210 is "NO", then the image sensor system 100 is operating in the PAL or SECAM mode and row select module 112 dictates a different read-out sequence than with NTSC mode. In this case, pixel array read-out sequence 200 proceeds to a step 230, in which five rows are read out sequentially. Fifth-line control signal 113 then activates and remains valid for one line time to insert an additional line. Pixel array read-out sequence 200 then pauses for one line time, the time it would normally take to read out one row in step 240. The row data is retained in the line buffer 118, and image data for the video encoder 122 for the additional line is derived for one line time by reading stored data from the line buffer 118 a second time 245, in which the last of these five rows is effectively read out in duplicate from line buffer 118. Then, a decision 250 is made as to whether the end of the frame (i.e., row 480) has been reached. If the answer to decision 250 is "YES", then pixel array read-out sequence 200 proceeds to a step 260 in which frame read-out is finished, and a vertical-blanking interval (as known in the PAL, NTSC and SECAM standards) is provided at video encoder 122. If the answer to decision 250 is "NO", then pixel array read-out sequence 200 returns to step 230, until step 250 determines that the final row in the frame has been read out.

In an alternative embodiment, where column sample-and-hold 106 is capable of storing and re-reading a row of pixels, data may be re-read from column sample-and-hold 106 instead of line buffer 118 to provide duplication of a row of pixel data in image data 120. In embodiments of this type, in order to provide correct color processing for sensors having a four-pixel color filter pattern, previous row data in line buffer 118 is not updated until the second reading of the row from column sample-and-hold 106.

Referring now to FIG. 3 in conjunction with FIG. 1, a comparison 300 of the read-out sequences in two different operation modes, in accordance with an embodiment, is further described. As can be seen in comparison 300, an NTSC read-out sequence 310 is shorter than a PAL read-out sequence 320. NTSC read-out sequence 310 is simply a sequential read-out of all rows. In comparison, PAL read out sequence 320 is such that every fifth line is read-out twice, for example line 322 is read out a second time as line 324, which results in reading a total of 480/5*6=576 lines, which exactly matches the size of the PAL visible raster.

In an embodiment, when image sensor system 100 operates in PAL or SECAM mode, in addition to traditional image processing routines, digital image processor 116 may also apply a vertical interpolation algorithm on the image data to provide improved additional line data in order to reduce or completely eliminate visual artifacts that may otherwise appear as a result of row duplications at the read-out stage (i.e., the reading of every fifth line twice). While stored image data in line buffer 118 is usually sufficient for this operation, it should be appreciated that additional pixel rows of memory in line buffer 118 may be provided to enhance the additional image processing required for interpolation. In applications where the vertical interpolation algorithm overwrites the original data of the duplicated rows stored in line buffer 118, digital image processor 116 will, in turn, populate those corresponding lines with interpolated data.

In an embodiment that performs interpolation, a linear interpolation is performed between pixels of one fifth line, for example line 322, and pixels of a second line following the fifth line, for example line 326, to produce a line 324 for display instead of simply duplicating the fifth line. In other embodiments, other interpolation algorithms are used, such as a quadratic fit.

In an alternative embodiment, the frame resolution of pixel array 102 is 240 rows, corresponding to one non-interlaced version of the NTSC standard, and image sensor system 100 operates similarly to that described in the previous embodiment. By duplicating every fifth row at the read-out stage, the total number of rows in the sensor pipeline in this embodiment is 240/5*6=288 which matches the size of the corresponding non-interlaced version of the PAL standard.

The concepts herein may be expanded to implement an image sensor that supports two or more other video standards with different numbers of visible scan lines. In an embodiment, the number of rows in pixel array 102 may be set to be equal to the number of visible scan lines of the video standard with the smallest number of visible scan lines N. When image sensor system 100 operates in the standard with a different number of visible scan lines M (where M≠N), row select module 112 will repeat its function every $(N/(M-N))^{th}$ row. Alternatively, another read-out sequence that results in M rows being read may be used.

The horizontal resolution, that is the number of pixels in one row, may also vary from standard to standard. In some embodiments, this difference may be accommodated by utilizing a pixel array 102 that has a horizontal resolution matching the supported standard with the largest horizontal resolution, and using digital image processor 116 to down-sample each row horizontally when operating in other standards. In another embodiment, pixel array 102 may be selected to match the standard with the smallest horizontal resolution, and digital image processor 116 may up-scale each row horizontally when operating in other standards. In still another embodiment, digital image processor 116 does not change (i.e., up-scale or down-sample) the horizontal resolution of the rows to match the standard specification. In this embodiment, it is recognized that, since standard-compliant analog data 128 is analog, the device on the receiving end of standard-compliant analog data 128 (such as a television set, video cassette recorder, or monitor) will typically display or record analog data without resampling. Digital devices, such as video capture cards, receiving the analog data will typically automatically over-or under-sample the row data, thereby effectively up-or down-scaling standard-compliant analog data 128 into the resolution set by the operating video standard at the receiving device.

While the examples in this disclosure describe image sensors supporting specific video standards (namely, PAL and NTSC) and specific frame sizes, it will be appreciated by those skilled in the art that the processes described and claimed herein may be applied to image sensors supporting other standards, such as SECAM, and other frame sizes, such as QCIF, CIF, CGA, QVGA, VGA, SXGA, WXGA, UXGA, WUXGA, 720p, 1080p, or any other standard or non-standard frame sizes.

The changes described above, and others, may be made in the image sensor system described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for providing image data in a first mode according to a first video specification having a first number of lines of image data and in a second mode according to a second video specification having a second number of lines of image data, the second number greater than the first number, and for an integer N, the system comprising:
    a video sensor having a pixel array having a third number of lines of pixels, the third number being equal to either the first number, when operating in interlaced versions of either the first video specification or the second video specification, or one-half the first number when operating in non-interlaced versions of either the first or second video specification;
    a video encoder for receiving digital video information and providing a video output;
    a line buffer capable of storing information corresponding to at least one line of pixels from the video sensor; and
    a controller capable of controlling operation of the system, the controller inserting an additional line after every Nth normal line in the second mode to increase a number of lines of image data provided to the video encoder to comply with the second video specification.

2. The system of claim 1 wherein N is 5, the first video specification is the National Television Standards Committee (NTSC) video specification, and the second video specification is a video specification selected from the group consisting of Phase Alternate Line (PAL) and SECAM.

3. The system of claim 1 wherein the digital video information provided to the video encoder during each additional line duplicates a previous line.

4. The system of claim 1 wherein the digital video information provided to the video encoder during each additional line is derived by interpolating between pixel data of a previous line and a following line.

5. A system for providing color image data in a first mode according to a first video specification having a first number of lines of image data and in a second mode according to a second video specification having a second number of lines of image data, the second number greater than the first number, comprising:
    a video sensor having a pixel array having a third number of lines of pixels, the third number being equal to either the first number, when operating in interlaced versions of either the first video specification or the second video specification, or one-half the first number, when operating in non-interlaced versions of either the first video specification or the second video specification;
    a video encoder for receiving color digital video information and providing a video output;
    a line buffer capable of storing information corresponding to at least a first and a second line of pixels from the video sensor; and
    a controller capable of controlling operation of the system, the controller inserting an additional line after every Nth normal line in the second mode to increase a number of lines of image data provided to the video encoder to comply with the second video specification,
    wherein digital video information having intensity information derived from at least one line of pixels and chroma information derived from at least two lines of pixels is provided to the video encoder in normal lines, and digital video information derived from at least two lines of pixels of the video sensor is received from the line buffer and provided to the video encoder during each additional line.

6. The system of claim 5 wherein the digital video information provided to the video encoder during each additional line is stored video information.

7. The system of claim 5 wherein the digital video information provided to the video encoder during each additional line is interpolated from at least two lines of pixels of stored video information.

\* \* \* \* \*